(12) United States Patent
Hayashi et al.

(10) Patent No.: US 6,632,273 B2
(45) Date of Patent: Oct. 14, 2003

(54) COLOR EMULSION INK FOR STENCIL PRINTING

(75) Inventors: Yoshihiro Hayashi, Ibaraki-ken (JP); Hirotoshi Yonekawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 134 days.

(21) Appl. No.: 09/940,899

(22) Filed: Aug. 29, 2001

(65) Prior Publication Data

US 2002/0043176 A1 Apr. 18, 2002

(30) Foreign Application Priority Data

Aug. 29, 2000 (JP) ........................................ 2000-258344

(51) Int. Cl.$^7$ .............................................. C09D 11/00
(52) U.S. Cl. ................................ 106/31.26; 106/31.64; 106/31.65
(58) Field of Search .......................... 106/31.26, 31.64, 106/31.65

(56) References Cited

U.S. PATENT DOCUMENTS

| 5,759,245 | A | | 6/1998 | Okuda et al. | |
|---|---|---|---|---|---|
| 5,904,759 | A | * | 5/1999 | Okuda et al. | 106/31.26 |
| 6,149,720 | A | * | 11/2000 | Asada et al. | 106/31.26 |
| 6,156,109 | A | * | 12/2000 | Asada | 106/31.26 |
| 6,165,258 | A | * | 12/2000 | Asada | 106/31.26 |

FOREIGN PATENT DOCUMENTS

| JP | 6-172693 A | 6/1994 |
|---|---|---|
| JP | 7-150091 A | 6/1995 |
| JP | 9-227818 A | 9/1997 |
| JP | 2000-53903 A | 2/2000 |

* cited by examiner

*Primary Examiner*—Helene Klemanski
(74) *Attorney, Agent, or Firm*—Nixon Peabody LLP; Donald R. Studebaker

(57) ABSTRACT

A color W/O emulsion ink for stencil printing includes a plurality of kinds of chromatic pigments different from each other in hue. The total amount of the chromatic pigments is not smaller than 1% by weight and not larger than 10% by weight of the total weight of the ink. The content of at least one of the chromatic pigments is smaller than 1% by weight and at least one of the chromatic pigments the content of which is smaller than 1% by weight is a specific pigment selected from the group consisting of anthraquinone series pigments, perinone.perylene series pigments, phthalocyanine series pigments, dioxazine series pigments, quinacridone series pigments and isoindolinone series pigments.

6 Claims, No Drawings

COLOR EMULSION INK FOR STENCIL PRINTING

BACKGROUND OF THE INVENTION

1. Field of the Invention

This invention relates to color W/O emulsion ink for stencil printing, and more particularly to color stencil printing W/O emulsion ink which is excellent in weather resistance of color.

2. Description of the Related Art

The stencil printing is advantageous over other printing systems such as offset printing, gravure printing, letterpress printing and the like in that it permits to easily make prints without a skilled operator and complicated cleaning after printing is not necessary.

From the advent of the thermal stencil making system using a thermal head, image processing in the stencil printing has come to be digitized, whereby it has become feasible to easily obtain high quality printings in a short time, which makes it feasible to use the stencil printer as an information processing terminal.

Further, in the thermal stencil making system using a thermal head, perforations can be more regular in size and accordingly the amount of ink transferred to the printing paper can be more accurately controlled than in the conventional stencil making system in which infrared rays or xenon flash is employed to perforate the stencil material. Thus by using the thermal stencil making system, probability of generation of offset and/or spread of ink is reduced and the quality of printings is greatly improved.

As the stencil printing ink, W/O emulsion ink is generally used. There have been proposed various color inks, for instance, in Japanese Unexamined Patent Publication Nos. 6(1994)-172693, 7(1995)-150091, 9(1997)-227818 and 2000-53903. In color ink for stencil printing, pigment and dye can be used as the coloring agent. However since dye is generally poor in weather resistance, pigment has been generally employed.

Recently, there has been an increasing demand for inks of various colors, e.g., a color between red and orange, slightly reddish purple and the like. An ink of a specific color can be basically produced by one kind of pigment provided that a pigment of the specific color exists. However since when each color is produced by one pigment, the number of pigments to be managed by the factory becomes too large and since a pigment of a special color is ordered in a small amount and accordingly is expensive, the kinds of pigments to be handled by the factory are generally limited and inks of colors which do not conform to the colors of the regular pigments (those regularly stocked in the factory) are generally produced by mixing the regular pigments. That is, inks of various colors are produced by mixing the regular chromatic pigments and fine color adjustment is effected by adding a fine amount of a chromatic pigment (generally smaller than 1% by weight of the total weight of the ink).

However, there has been a problem that since containing a plurality of components different in nature, e.g., oil, water and surface active agent, the W/O emulsion ink is apt to discolor, which makes vain the fine color adjustment. Accordingly, conventionally, the color W/O emulsion ink for stencil printing have generally contained each chromatic pigment in an amount not smaller than 1%by weight. This limits fine color adjustment.

SUMMARY OF THE INVENTION

In view of the foregoing observations and description, the primary object of the present invention is to provide a color W/O emulsion ink for stencil printing which produces a finely adjusted color and the color development performance of which is constant.

Another object of the present invention is to provide a color W/O emulsion ink for stencil printing which produces a finely adjusted color and at the same time does not change with time in its hue, chroma and brightness.

In accordance with the present invention there is provided a color W/O emulsion ink for stencil printing including a plurality of kinds of chromatic pigments different from each other in hue, the total amount of the chromatic pigments being not smaller than 1% by weight and not larger than 10% by weight of the total weight of the ink, wherein the improvement comprises that the content of at least one of the chromatic pigments is smaller than 1% by weight and at least one of the chromatic pigments the content of which is smaller than 1% by weight is a specific pigment selected from the group consisting of anthraquinone series pigments, perinone.perylene series pigments, phthalocyanine series pigments, dioxazine series pigments, quinacridone series pigments and isoindolinone series pigments.

The "hue" as used here means one of ten colors when color are divided into ten, i.e., yellow, green yellow, green, blue green, blue, purple blue, purple, red purple, red and yellow red.

When a plurality of pigments are contained in the ink in an amount smaller than 1% by weight, it is preferred that all the pigments be the specific pigments.

It is preferred that the content of the oil phase be 15 to 50% by weight and the content of the water phase is 50 to 85% by weight.

It is preferred that at least one of the chromatic pigments the content of which is smaller than 1% by weight satisfies the following formula and all of the chromatic pigments which satisfy the formula and whose contents are smaller than 1% by weight be the specific pigments $$0.01 \leq (PS)^2/PT \leq 0.1$$

wherein PS represents the weight of the chromatic pigment in terms of % by weight to the total weight of the ink and PT represents the total weight of the chromatic pigments included in the ink in terms of % by weight to the total weight of the ink.

In the emulsion ink of stencil printing of the present invention, the chromatic pigment the content of which is smaller than 1% by weight contributes to fine color adjustment and a finer color can be obtained. At the same time, since anthraquinone series pigments, perinone.perylene series pigments, phthalocyanine series pigments, dioxazine series pigments, quinacridone series pigments and isoindolinone series pigments are excellent in weather resistance in a W/O emulsion ink, and are less apt to discolor, the emulsion ink containing therein such a chromatic pigment is stable in its hue, chroma, brightness and color development performance even after long storage or storage at a high temperature.

That is, when the chromatic pigment the content of which is smaller than 1% by weight is an organic pigment such as soluble azoic pigments, insoluble azoic pigments, basic and acidic lake pigments and the like, the pigment is discolored by the other components of the ink such as oil, water and surface active agent and the color development performance of the ink, e.g., hue and chroma, varies. At the same time, when the chromatic pigment the content of which is smaller than 1% by weight is inorganic pigment which is poor in color power and sharpness, it is difficult to use the chromatic pigment to adjust the color of the ink.

When all the pigments contained in the ink in an amount smaller than 1% by weight are the specific pigments, the emulsion ink can be more stable in hue, chroma and brightness against aging.

When at least one of the chromatic pigments the content of which is smaller than 1% by weight satisfies the following formula and all of the chromatic pigments which satisfy the formula and whose contents are smaller than 1% by weight are the specific pigments $$0.01 \leq (PS)^2/PT \leq 0.1$$

wherein PS represents the weight of the chromatic pigment in terms of % by weight to the total weight of the ink and PT represents the total weight of the chromatic pigments included in the ink in terms of % by weight to the total weight of the ink, the emulsion ink can be further more stable in hue, chroma and brightness against aging.

DETAILED DESCRIPTION OF THE INVENTION

The present invention will be described in more detail with reference to embodiments, hereinbelow.

As described above, the color W/O emulsion ink for stencil printing in accordance with the present invention includes a plurality of kinds of chromatic pigments different from each other in hue, the total amount of the chromatic pigments being not smaller than 1% by weight and not larger than 10% by weight of the total weight of the ink, and characterized in that the content of at least one of the chromatic pigments is smaller than 1% by weight and at least one of the chromatic pigments the content of which is smaller than 1% by weight is a specific pigment selected from the group consisting of anthraquinone series pigments, perinone.perylene series pigments, phthalocyanine series pigments, dioxazine series pigments, quinacridone series pigments and isoindolinone series pigments.

When a plurality of chromatic pigments are contained in an amount smaller than 1% by weight, it is preferred that all the chromatic pigments be the specific pigments.

When the content of a chromatic pigment is from 0.1 to 0.4% by weight, it is especially preferred that the chromatic pigment be a specific pigment.

When a pigment the content of which is smaller than 1% by weight satisfies the aforesaid formula $$0.01 \leq (PS)^2/PT \leq 0.1,$$

it is preferred that the pigment be a specific pigment. For example, when an ink contains 0.3% by weight of a blue pigment and 5.2% by weight of a red pigment, it is preferred that the blue pigment be a specific pigment since the blue pigment satisfies the formula. Similarly, when an ink contains 0.1% by weight of a blue pigment and 0.9% by weight of a red pigment, it is preferred that the blue pigment be a specific pigment since the blue pigment satisfies the formula and the red pigment does not satisfy the formula. Further, when an ink contains 0.3% by weight of a blue pigment, 0.7% by weight of a red pigment and 4.5% by weight of an yellow pigment, it is preferred that the blue pigment and the red pigment be specific pigments since the blue pigment and the red pigment both satisfy the formula.

When the value of $(PS)^2/PT$ is smaller than 0.01, the hue of the ink is little affected by the chromatic pigment, and necessity of preventing discoloration of the pigment, that is necessity for the pigment to be a specific pigment, is reduced. On the other hand, when the value of $(PS)^2/PT$ is larger than 0.1, the chromatic pigment is less apt to discolor even if the content thereof is smaller than 1% by weight of the total weight of the ink, and necessity for the pigment to be a specific pigment, is reduced.

As the anthraquinone series pigments, dianthraquinonyl red, indanthrone blue, anthanthrone orange, anthrapyrimidine yellow, flavanthrone yellow and the like may be used. As the perinone.perylene series pigments, perinone orange, perylene red, perylene violet, perylene maroon, perylene scarlet, perylene vermilion, and the like may be used. As the phthalocyanine series pigments, phthalocyanine blue, phthalocyanine green and the like may be used. As the dioxazine series pigments, for instance, carbazole violet may be used. As the quinacridone series pigments, quinacridone red, quinacridone magenta, dichloroquinacridone magenta, quinacridone scarlet, and the like may be used. As the isoindolinone series pigments, isoindolinone yellow R, isoindolinone yellow G, isoindolinone orange and the like may be used.

As the chromatic pigment the content of which is not smaller than 1% by weight, known pigments of various colors may be employed. However organic pigments are preferred to inorganic pigments. As such organic pigments, insoluble azo-pigments such as β-naphthol series pigments, naphthol AS series pigments, acetoacetic anilide series pigments, pyrazolone series pigments and the like (e.g., disazo yellow and lake red 4R); soluble azo-pigments such as Ca lake, Ba lake, Sr lake, Mn lake and the like (e.g., brilliant carmine 6B, lake red C and Watchung red); basic lake pigments such as tannic acid lake, phosphomolybdic acid lake, phosphotungstic acid lake and phosphomolybdic-tungstic acid lake (e.g., Rhodamine B lake, Rhodamine 6G lake and Methyl Violet Lake), acidic lake pigments such as Ba lake, Ca lake, Al lake and Pb lake (e.g., orange II lake and quinoline yellow lake), the aforesaid specific pigments (i.e., anthraquinone series pigments, perinone.perylene series pigments, phthalocyanine series pigments, dioxazine series pigments, quinacridone series pigments and isoindolinone series pigments) and the like can be employed.

The specific pigment the content of which is smaller than 1% by weight may be contained in either the oil phase or the water phase. Further pigments other than the specific pigments may also be in either the oil phase or the water phase. However it is preferred that all the chromatic pigments be contained in one of the oil phase and the water phase to prevent color separation.

The oil phase basically comprises pigments, emulsifier and oil components. When the water phase contains pigments, the oil phase need not contain pigments.

A fine amount of black pigment may be added to control the brightness of the ink. As the black pigment, carbon blacks such as furnace black, lamp black, acetylene black and channel black are suitable. The content of the black pigment is preferably not larger than 0.5% by weight of the total weight of the ink, and more preferably 0.1 to 0.3% by weight of the total weight of the ink.

The emulsifier is for forming W/O emulsion and may be any of anion surface active agents, cation surface active agents, amphoteric surface active agents and nonionic surface active agents. From the viewpoints of emulsification of the W/O emulsion and the storage stability, nonionic surface active agent is preferred. For example, fatty acid esters of sorbitan such as sorbitan monolaurate, sorbitan monopalmitate, sorbitan monooleate, sorbitan sesquioleate, sorbitan monoisostearate, and the like; glycerides such as glyceryl monostearate, hexaglyceryl tetraoleate, decaglyceryl decaoleate, hexaglyceryl pentaoleate and the like; fatty acid esters of polyoxyethylene sorbitan; fatty acid esters of polyoxyethylene glycerin; fatty acid esters of polyoxyethylene sorbitol; fatty acid esters of propylene glycol; fatty acid esters of (poly)ethylene glycol; polyoxyethylene alkylether; polyoxyethylenepolyoxypropylene alkylether; polyoxyethylene alkylphenylether; and polyoxyethylene (cured) castor oil may be suitably used. One emulsifier may be used alone or two or more kinds of emulsifiers may be used in combination. The content of the emulsifier is preferably 0.1 to 10% by weight of the total weight of the ink, and more preferably 1 to 5% by weight of the total weight of the ink.

As the oil components, various industrial solvents; mineral oils such as motor oil, gear oil, gas oil, kerosene, spindle oil, machine oil, liquid paraffin and the like; vegetable oils such as olive oil, colza oil, castor oil, linseed oil, salad oil, soybean oil and the like; as well as synthetic oils can be suitably employed. It is preferred that a mixture of a plurality of oils different in volatility is employed in order to improve, for instance, printing performance after the printer is kept unoperated for a long time.

It is preferred that the oil phase contains resin, and if desired the oil phase may contain extending pigment, gelling agent, antioxidant, pigment dispersant and the like.

The resin is employed to provide a viscosity to the ink and to increase stability of the emulsion. When the oil phase contains therein pigment and/or extending pigment, the resin improve the dispersion of the pigments and enhances fixing to the printing paper of the pigments. Oil-soluble resins are employed. For example, rosin, gilsonite, rosin ester, maleic acid resin, phenol resin, alkyd resin, petroleum resin, acrylic resin, amino resin, urethane resin, cellulose resin, natural rubber derivative resin and the like may be suitably used. Among those, phenol resin and alkyd resin are especially preferred. Further, reaction products with aluminum chelate compounds such as disclosed in Japanese Unexamined Patent Publication No. 2000-7972 may be suitably used. The content of resin is preferably 1 to 20% by weight of the total weight of the ink, and more preferably 3 to 15% by weight of the total weight of the ink.

The main component of the water phase is water. When the oil phase does not contain a chromatic pigment, the water phase contains chromatic pigments. The chromatic pigments may be those described above as chromatic pigments which may be contained in the oil phase. Black pigments which are described above in conjunction with the oil phase may be added also to the water phase.

It is preferred that the water phase includes evaporation retardant and antifreezing agent. For example, water-soluble organic solvents, e.g., polyhydric alcohols such as ethylene glycol, propylene glycol, diethylene glycol, polyethylene glycol and glycerin, may be employed. The content of such components is preferably 1 to 20% by weight of the total weight of the water phase, and more preferably 3 to 15% by weight of the total weight of the water phase.

It is preferred that the water phase further includes electrolytes and pH adjustors. For example, sodium sulfate, magnesium sulfate, potassium hydrogenphosphate, sodium citrate, potassium tartrate, sodium borate and triethanolamine are suitable. The content of such components is preferably 0.1 to 2% by weight of the total weight of the water phase, and more preferably 0.3 to 1.5% by weight of the total weight of the water phase.

If necessary, the water phase may include O/W resin emulsion and/or water-soluble resin. When chromatic pigments and/or extending pigment are added to the water phase, the O/W resin emulsion and/or water soluble resin improve wettability and dispersion of the pigments and enhances fixing to the printing paper of the pigments.

As the O/W resin emulsion, emulsions of polyvinyl acetate, ethylene-vinyl acetate copolymer, vinyl acetate-acrylic ester copolymer, polymethacrylic ester, polystyrene, styrene-acrylic ester copolymer, styrene-butadiene copolymer, vinylidene chloride-acrylic ester copolymer, polyvinyl chloride, vinyl chloride-vinyl acetate copolymer and polyurethane are suitable.

As the water-soluble resin, polyvinyl alcohol, methyl cellulose, carboxymethyl cellulose, hydroxyethyl cellulose, polyvinylpyrrolidone, polyethylene-polyvinyl alcohol copolymer, polyethylene oxide, polyvinyl ether, polyacrylamide, gum Arabic, starch, water-soluble urethane and the like are suitable.

In order to improve wettability and dispersion of the pigments, anion surface active agents, cation surface active agents, amphoteric surface active agents, nonionic surface active agents, high-polymer surface active agents, silicone surface active agents, fluorine surface active agents, tertiary amine compounds disclosed in Japanese Unexamined Patent Publication No. 8(1996)-34944 and acid anhydride-containing water-soluble polymers disclosed in Japanese Unexamined Patent Publication No. 10(1998)-1634 may be added to the water phase. The tertiary amine compounds and the acid anhydride-containing water-soluble polymers are preferred since they can finely and stably disperse the chromatic pigments and the extending pigments in the water phase without deteriorating stability of the emulsion.

Extending pigments, preservatives, antifungal agents, antioxidants and the like may be added to the water phase as desired.

The W/O emulsion ink of the present invention is generally produced by gradually adding 50 to 85% by weight of water phase to 15 to 50% by weight of oil phase and emulsifying the mixture. The present invention will be described in further detail with reference to an example, hereinbelow.

EXAMPLE

W/O emulsion inks were produced in the manner described in the following embodiments 1 to 4 and the following comparative examples 1 and 2 employing compositions shown in the following table 1. The values in the following table 1 are in terms of % by weight.

Embodiment 1

A liquid mixture of quinacridone magenta, alkyd resin, paraffin series solvent, polyglyceryn fatty acid ester and polyoxyethylene castor oil and a liquid mixture of watchung red, alkyd resin, paraffin series solvent, polyglyceryn fatty acid ester and polyoxyethylene castor oil were separately dispersed well with a triple roll mill. The resultant dispersions were introduced into an emulsifier together with spindle oil and olefin series solvent and the mixture were stirred, thereby obtaining an oil phase. A mixed solution of ion-exchanged water, glycerin and magnesium sulfate were dropped in the oil phase little by little with the agitating element rotated. In this manner, emulsification were continued until a desired viscosity is obtained, whereby slightly purplish red emulsion ink for stencil printing was obtained.

Embodiment 2

Purplish red emulsion ink for stencil printing of a second embodiment was obtained in the same manner as the first embodiment except that the composition was as shown in the following table 1.

Embodiment 3

Bluish purple emulsion ink for stencil printing of a third embodiment was obtained in the same manner as the first embodiment except that the composition was as shown in the following table 1.

Embodiment 4

Reddish red purple emulsion ink for stencil printing of a fourth embodiment was obtained in the same manner as the first embodiment except that the composition was as shown in the following table 1.

COMPARATIVE EXAMPLE 1

Reddish red purple emulsion ink for stencil printing of a first comparative example was obtained in the same manner as the first embodiment except that the composition was as shown in the following table 1.

COMPARATIVE EXAMPLE 2

Reddish purple emulsion ink for stencil printing of a second comparative example was obtained in the same manner as the first comparative example except that the composition was as shown in the following table 1.

TABLE 1

|  | emb 1 | emb 2 | emb 3 | emb 4 | ex 1 | ex 2 |
|---|---|---|---|---|---|---|
| oil phase |  |  |  |  |  |  |
| quinacridone magenta | 0.3 | — | — | 3.2 | 5.2 | — |
| carbazole violet | — | 0.3 | 3.7 | — | — | 3.7 |
| phthalocyanine blue | — | — | 0.3 | 0.3 | — | — |
| watchung red | 5.2 | 3.7 | — | 2.0 | 0.3 | 0.3 |
| alkyd resin | 9.0 | 11.5 | 9.0 | 8.0 | 7.0 | 9.0 |
| spindle oil | 6.0 | 6.0 | 5.5 | 5.0 | 4.0 | 5.5 |
| paraffin series solvent | 8.0 | 7.0 | 10.0 | 10.0 | 12.0 | 10.0 |
| olefin series solvent | 3.0 | 3.0 | 3.0 | 3.0 | 3.0 | 3.0 |
| polyglyceryn fatty acid ester | 1.5 | 1.5 | 1.5 | 1.5 | 1.5 | 1.5 |
| polyoxyethylene castor oil | 0.5 | 0.5 | 0.5 | 0.5 | 0.5 | 0.5 |
| water phase |  |  |  |  |  |  |
| ion-exchanged water | 60.0 | 60.0 | 60.0 | 60.0 | 60.0 | 60.0 |
| glycerin | 6.0 | 6.0 | 6.0 | 6.0 | 6.0 | 6.0 |
| magnesium sulfate | 0.5 | 0.5 | 0.5 | 0.5 | 0.5 | 0.5 | emb = embodiment
ex = comparative example

The stencil printing emulsion inks of the first to fourth embodiments and the first and second comparative examples were contained in a sealed container and stored for twenty days at 70° C.

The inks of the first to fourth embodiments, in which the pigments the content of which were smaller than 1% by weight of the total weight of the ink were specific pigments i.e., a quinacridone series pigment (quinacridone magenta), a dioxazine series pigment (carbazole violet) and a phthalocyanine series pigments (phthalocyanine blue), did not discolor after the storage. To the contrast, the inks of the first and second comparative examples, in which the pigment the content of which was smaller than 1% by weight of the total weight of the ink was not a specific pigment but a soluble azo-pigment (watching red), discolored after the storage, that is, became less in reddishness.

As can be understood from the description above, the inks of the embodiments of the present invention produced a finely adjusted color and at the same time did not change in its hue, chroma and brightness even after a long storage at an elevated temperature.

What is claimed is:

1. A color W/O emulsion ink for stencil printing including a water phase and an oil phase and including a plurality of kinds of chromatic pigments different from each other in hue, the total amount of the chromatic pigments being not smaller than 1% by weight and not larger than 10% by weight of the total weight of the ink, wherein the improvement comprises:

the W/O emulsion ink includes the plurality of chromatic pigments and the content of at least one of the chromatic pigments is smaller than 1% by weight and at least one of the chromatic pigments the content of which is smaller than 1% by weight is a specific pigment selected from the group consisting of anthraquinone series pigments, perinone.perylene series pigments, phthalocyanine series pigments, dioxazine series pigments, quinacridone series pigments and isoindolinone series pigments.

2. A color W/O emulsion ink for stencil printing as defined in claim 1 in which a plurality of pigments are contained in the ink in an amount smaller than 1% by weight and all of the pigments the content of which is smaller than 1% by weight are the specific pigments.

3. A color W/O emulsion ink for stencil printing as defined in claim 1 in which the content of the oil phase is 15 to 50% by weight of the total weight of the ink and the content of the water phase is 50 to 85% by weight of the total weight of the ink.

4. A color W/O emulsion ink for stencil printing as defined in claim 1 in which at least one of the chromatic pigments the content of which is smaller than 1% by weight satisfies the following formula and all of the chromatic pigments which satisfy the formula and whose contents are smaller than 1% by weight are the specific pigments $$0.01 \leq (PS)^2/PT \leq 0.1$$

wherein PS represents the weight of the chromatic pigment in terms of % by weight to the total weight of the ink and PT represents the total weight of the chromatic pigments included in the ink in terms of % by weight to the total weight of the ink.

5. A color W/O emulsion ink for stencil printing as defined in claim 1 in which the plurality of pigments are present only in the oil phase.

6. A color W/O emulsion ink for stencil printing including a water phase and an oil phase and including a plurality of kinds of chromatic pigments different from each other in hue, the total amount of the chromatic pigments being not smaller than 1% by weight and not larger than 10% by weight of the total weight of the ink, wherein the improvement comprises:

the oil phase includes the plurality of chromatic pigments and the content of at least one of the chromatic pigments is smaller than 1% by weight and at least one of the chromatic pigments the content of which is smaller than 1% by weight is a specific pigment selected from the group consisting of anthraquinone series pigments, perinone.perylene series pigments, phthalocyanine series pigments, dioxazine series pigments, quinacridone series pigments and isoindolinone series pigments.

* * * * *